(12) United States Patent
Ambrose

(10) Patent No.: US 6,595,704 B2
(45) Date of Patent: Jul. 22, 2003

(54) TWO DEGREE OF FREEDOM CAMERA MOUNT

(75) Inventor: Robert O. Ambrose, Houston, TX (US)

(73) Assignee: Metrica, Inc., Houston, TX (US)

(*) Notice: Subject to any disclaimer, the term of this patent is extended or adjusted under 35 U.S.C. 154(b) by 0 days.

(21) Appl. No.: 09/827,986

(22) Filed: Apr. 6, 2001

(65) Prior Publication Data

US 2002/0146249 A1 Oct. 10, 2002

(51) Int. Cl.[7] .................. G03B 17/00; G03B 29/00; G03B 35/00
(52) U.S. Cl. .................. 396/428; 396/325; 396/427; 348/143; 348/159; 348/373; 352/132; 352/243
(58) Field of Search .................. 396/324, 325, 396/328, 419, 427, 428; 352/243, 132; 348/143, 144, 151, 159, 373

(56) References Cited

U.S. PATENT DOCUMENTS

| | | | |
|---|---|---|---|
| 3,608,458 A | * | 9/1971 | Ratliff, Jr. .................. 359/462 |
| 3,916,097 A | * | 10/1975 | Imai .................. 348/151 |
| 4,040,071 A | * | 8/1977 | Shane .................. 396/325 |
| 4,431,290 A | * | 2/1984 | Kennedy .................. 396/182 |
| 4,855,823 A | * | 8/1989 | Struhs et al. .................. 348/151 |
| 4,932,831 A | | 6/1990 | White et al. |
| 5,022,812 A | | 6/1991 | Coughlan et al. |
| 5,073,749 A | | 12/1991 | Kanayama |
| 5,153,623 A | * | 10/1992 | Bouvier .................. 348/151 |
| 5,363,305 A | | 11/1994 | Cox et al. |
| 5,413,454 A | | 5/1995 | Movsesian |
| 5,443,354 A | | 8/1995 | Stone et al. |
| 5,460,341 A | | 10/1995 | Katsuyama et al. |
| 5,561,498 A | | 10/1996 | Sekine et al. |
| 5,585,707 A | | 12/1996 | Thompson et al. |
| 5,652,617 A | | 7/1997 | Barbour |
| 5,721,585 A | | 2/1998 | Keast et al. |
| 5,752,276 A | | 5/1998 | Baudou et al. |
| 5,758,734 A | | 6/1998 | Hong et al. |
| 5,805,212 A | | 9/1998 | Fujiwara |
| 5,845,009 A | | 12/1998 | Marks et al. |
| 5,869,910 A | | 2/1999 | Colens |
| 5,903,306 A | | 5/1999 | Heckendorn et al. |
| 5,942,869 A | | 8/1999 | Katou et al. |
| 6,027,257 A | | 2/2000 | Richards et al. |
| 6,040,854 A | | 3/2000 | Esser et al. |
| 6,044,183 A | | 3/2000 | Pryor |
| 6,045,272 A | | 4/2000 | Ryan et al. |
| 6,046,768 A | | 4/2000 | Kaneda et al. |
| 6,068,073 A | | 5/2000 | Roston et al. |
| 6,072,525 A | | 6/2000 | Kaneda |
| 6,268,882 B1 | * | 7/2001 | Elberbaum .................. 348/143 |
| 6,357,936 B1 | * | 3/2002 | Elberbaum .................. 206/316.2 |

FOREIGN PATENT DOCUMENTS

| | | |
|---|---|---|
| JP | 3-86486 | 4/1991 |
| JP | 3-117577 | 5/1991 |
| JP | 4-8495 | 1/1992 |
| JP | 4-365104 | 12/1992 |
| JP | 5-131381 | 5/1993 |

\* cited by examiner

*Primary Examiner*—Alan A. Mathews
(74) *Attorney, Agent, or Firm*—Watts, Hoffmann, Fisher & Heinke Co.

(57) ABSTRACT

A two degree of freedom camera mount. The camera mount includes a socket, a ball, a first linkage and a second linkage. The socket includes an interior surface and an opening. The ball is positioned within an interior of the socket. The ball includes a coupling point for rotating the ball relative to the socket and an aperture for mounting a camera. The first and second linkages are rotatably connected to the socket and slidably connected to the coupling point of the ball. Rotation of the linkages with respect to the socket causes the ball to rotate with respect to the socket.

23 Claims, 9 Drawing Sheets

TWO DEGREE OF FREEDOM CAMERA MOUNT

GOVERNMENT RIGHTS

This invention was made with government support under contract NAS9-00038 awarded by NASA. The government has certain rights in this invention.

TECHNICAL FIELD

The present invention relates to a camera mount and, more particularly, the present invention relates to a ball and socket camera mount which may be used in conjunction with a robotic arm and head unit.

BACKGROUND ART

It is known in the prior art to use serial mechanisms, such as a pan and tilt mechanism for mounting a camera. Typically, pan and tilt mechanisms include a base, a rotatable pan platform and rotatable tilt bed for supporting and selectively orienting a camera in a desired direction. The pan platform is rotatably supported on the base about a pan axis and the tilt bed is rotatably supported on the pan. The tilt bed rotates about a tilt axis that is transverse to the pan axis. A pan motor drives the pan platform and a tilt motor drives the tilt bed in response to control signals that are provided to the unit.

Typical pan and tilt mechanisms require that the pan motor must drive the mass of the tilt motor, as well as the camera. The additional inertia required to drive the pan motor as a result of driving the weight of the tilt motor makes the pan tilt mechanism sluggish and unresponsive. In addition, the structure associated with the pan must also be driven by the pan motor, further decreasing the responsiveness of the camera mount. What is needed is a parallel mechanism for mounting a camera where the weight of the second motor does not have to be propelled by the first motor to orient the camera.

Disclosure of Invention

The present invention concerns a camera mount. The camera mount includes a socket, a ball, and at least one linkage. The socket includes an interior surface and an opening. The ball is positioned within a region defined by the interior surface of the socket. The ball includes an aperture for mounting a camera. The linkage is connected to the ball such that movement of the linkage causes rotation of the ball with respect to the socket.

In one embodiment, two linkages are comprised of first and second arms. The first and second arms are rotatably connected to the socket. The first arm includes a slot that is coupled to a post that extends from the ball. The post is constrained to motion along the first path defined by the slot in the first arm. The second arm includes a slot that is also coupled to the post extending from the ball. The post is constrained to motion along a second path that is defined by the second slot. Rotation of the first arm with respect to the socket moves the post along the second path. Rotation of the first arm moves the post extending from the ball along the first path. Controlled rotation of the first and second arms cause controlled rotation of the ball with respect to the socket.

In one embodiment, each arm includes a shaft portion and a coupling portion that includes the slot. Rotation of the shaft portion causes relative rotation between the coupling portion of the arm and the socket to move the ball with respect to the socket. In one embodiment, two camera mounts are coupled together for mounting stereo cameras.

One embodiment of the present invention concerns a robotic arm and head unit. The robotic arm and head unit includes a robotic arm, a robotic head, a camera mount, a camera, and a control. The robotic arm and robotic head are connected to a deck. The camera mount is connected to the robotic head. The camera mount includes a socket, a ball, and a linkage. The socket has an interior surface. The ball is positioned within a region defined by the interior surface and the socket. The ball includes an aperture for mounting a camera. The linkage is operably connected to the ball for rotating the ball in the socket. The camera is connected to the camera mount. The control moves the arm and head and positions the camera.

In one embodiment, a second camera mount is coupled to the first camera mount for mounting a stereo camera. In this embodiment, perception of an object by said cameras provides a signal to the control. The signal is processed by the control to determine the position of the object and the control causes the arm to move a tool attached to an end of the arm to the position of the sensed object. In one embodiment, the head is mounted to the deck by a robotic neck.

A camera is positioned with the camera mount of the present invention by mounting a camera in the aperture in the ball. One of the linkages operably connected to the ball are moved to rotate the ball within the interior region of the socket to position the camera.

In one embodiment, a shaft portion of a first linkage is rotated to cause rotation of an arm portion of the first linkage with respect to the socket. Rotation of the first arm portion moves a coupling post extending from the ball along a first path defined by a slot in a second arm portion of a second linkage to rotate the ball with respect to the socket. A shaft portion of a second linkage is rotated to cause rotation of a second arm portion of the second linkage with respect to the socket. Rotation of the second arm portion moves the coupling post along a second path that is defined by a slot in the first arm portion of the first linkage to move the ball with respect to the socket.

Additional features of the invention will become apparent and a fuller understanding obtained by reading the following detailed description in connection with the accompanying drawings.

BEST MODE FOR CARRYING OUT THE INVENTION

Figure 1:
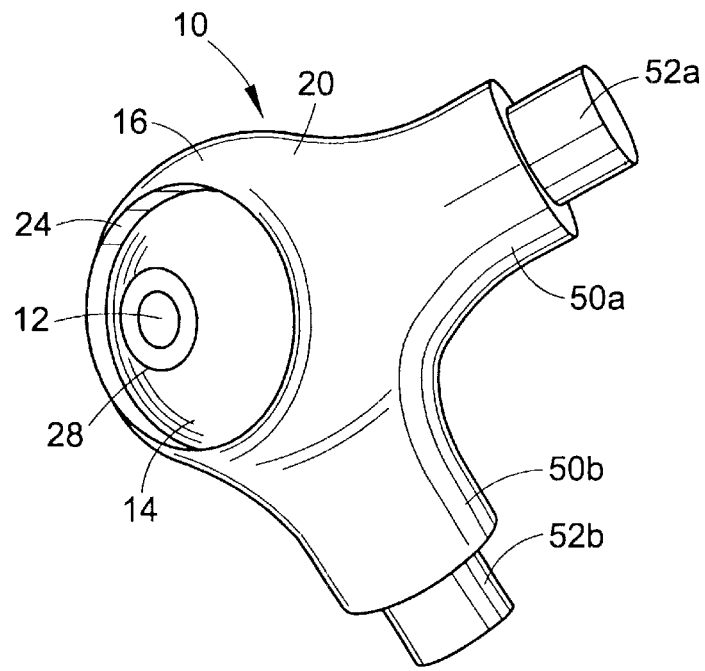
FIG. 1 is a perspective view of a camera mount of the present invention.

The present invention is directed to a camera mount 10 for controlled positioning and aiming of a camera 12. The camera mount 10 includes a socket 16, a ball 14, and one or more linkages 18. The socket 16 includes an exterior surface 20, an interior surface 22 that defines an opening 24. The ball 14 is positioned within a cavity 26 defined by the interior surface 22 of the socket 16. The ball 14 includes an aperture 28 for mounting the camera 12. The linkage 18 is operably connected to the ball 14. Movement of the linkage 18 is controlled to control relative rotational movement of the ball 14 with respect to the socket 16.

Figure 2:
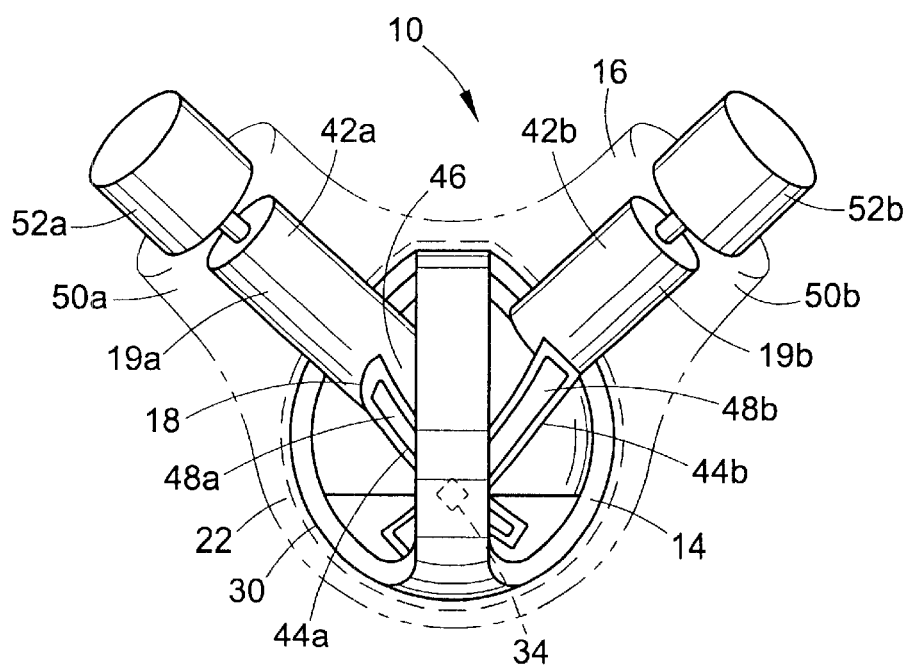
FIG. 2 is a perspective view of first and second linkages, a ball, and a socket of the camera mount of the present invention.
Figure 3:
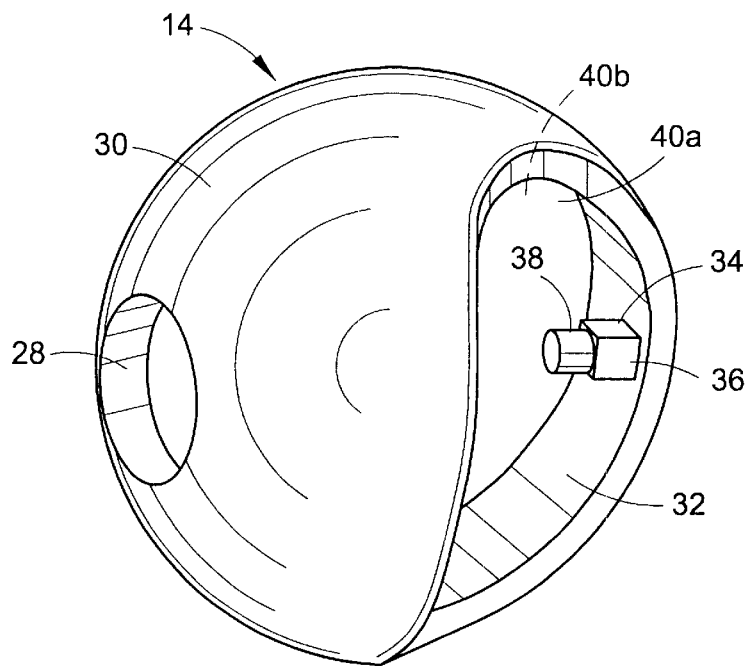
FIG. 3 is a ball of a camera mount of the present invention.

A first embodiment of the camera mount 10 illustrated in FIGS. 1–4. The ball 14 of this embodiment is illustrated in FIG. 3. The ball 14 includes an outer surface 30 that is defined by a sphere in the exemplary embodiment. In this embodiment, the ball 14 is hollow having an inner surface 32. A post 34 extends from the inner surface 32 toward a central axis of the ball 14. The post 34 includes a square portion 36 and a round portion 38. The ball 14 includes two linkage openings 40a, 40b that allow the post 34 extending from the inner surface 32 of the ball 14 to be accessed. The ball 14 also includes an aperture 28 through which the camera 12 may view various objects.

Figure 4:
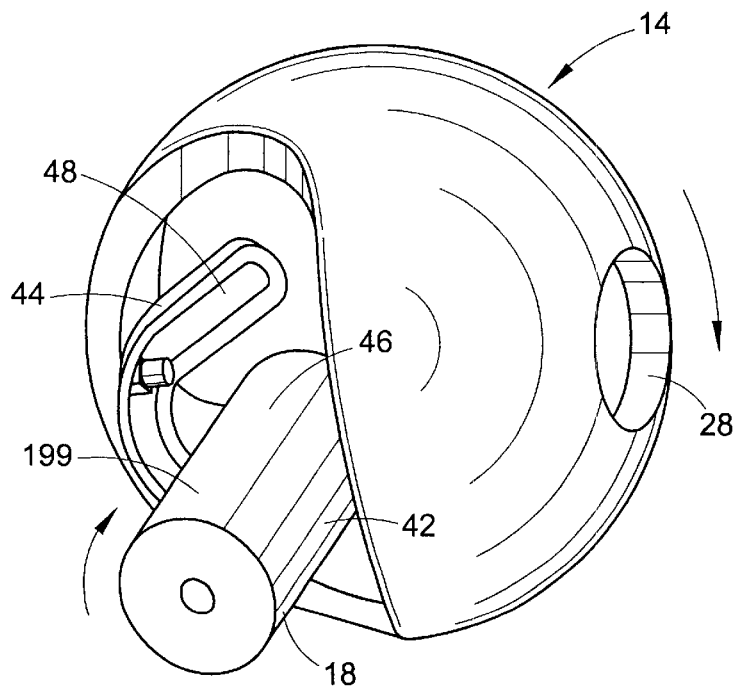
FIG. 4 is a linkage coupled to a ball of a camera mount of the present invention.

The embodiment shown in FIGS. 1–4, includes first and second rotational linkages 19a, 19b. Each rotational linkage 19a, 19b is constrained to rotation about a single axis. Each rotational linkage 19a, 19b includes a shaft portion 42 and an arm 44. Referring to FIG. 4, the shaft portion 42 of each rotational linkage is cylindrical in shape and is sized to fit through the linkage openings 40a, 40b in the ball. The arm 44 extends from a first end 46 of the shaft 42. Each arm 44 includes a slot 48 that is sized to fit over the post 34 of the ball 14. In the exemplary embodiment, the arm 44 of the first rotational linkage 19a, 19b is positioned such that the slot is disposed around the square portion 36 of the post 34. The second rotational linkage 19b is positioned such that the slot 48 is disposed around the round portion 38 of the post 34.

Referring to FIG. 2, in the embodiment the socket 16 includes a spherical interior surface 22 that is sized to fit around the spherical outer surface 30 of the ball 14. The interior surface of the socket is slightly larger than the outer surface of the ball, allowing the ball 14 to rotate freely within the socket 16. In the embodiment illustrated by FIGS. 1–4, the socket 16 includes first and second sleeves 50a, 50b that are sized to fit around the shaft portion 42 of each of the linkages 18 and allow the shaft portions 42 to rotate within the sleeves 50a, 50b. Referring to FIG. 1, the opening 24 in the socket 16 is circular and is substantially larger than the aperture 28 of the ball 14, allowing for a large field of view.

In the exemplary embodiment, first and second knobs 52a, 52b are connected to the shaft portions of each of the linkages 18. The knobs 52a, 52b are mechanically connected to a servomotor (not shown) or other source of controlled rotary power.

The camera mount 10 depicted by FIGS. 1–4 allows the camera 12 to be positioned by selectively rotating the shaft portions 42 of the rotational linkages 19a, 19b. When the shaft portion 42 of the first rotational linkage 19a is rotated within the first sleeve 50a of the socket 16, the first arm 44a rotates with the first end 46 of the shaft. The arm of the first rotational linkage 19a engages the post 34 and moves the post 34 along a path defined by the slot 48b of the second rotational linkage 19b. Movement of the post 34 causes the ball 14 to rotate within the socket 16. When the shaft portion 42b of the second rotational linkage 19a is rotated within the second sleeve 50b, the second arm 44b moves with the second shaft. The post 34 is moved along a path defined by the slot 48a of the first rotational linkage 19a causing the ball 14 to rotate within the socket 16. The shaft portions 42a, 42b can be moved simultaneously to quickly position the camera 12. By rotating the shaft portions 42a, 42b in a controlled manner, the camera mount 10 accurately positions the camera 12 in a very responsive manner, because neither of the servomotors which drive the linkages 18 has to carry the weight of the other servomotor.

Figure 5:
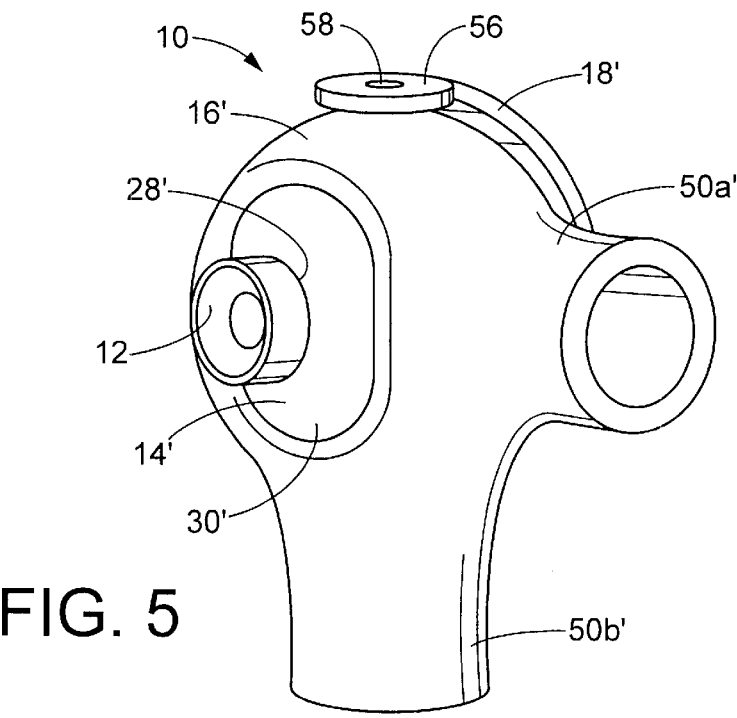
FIG. 5 is a perspective view of a camera mount of the present invention.

A second embodiment of the camera mount 10 is illustrated in FIGS. 5–8. The ball 14' of this embodiment includes a post 34' (FIG. 8) that extends from an outer surface 30' of the ball 14'. The ball 14' includes an outer surface 30' that is defined by a sphere in the exemplary embodiment. The ball 14' is hollow, leaving room for the camera 12 to be mounted. In the exemplary embodiment, the post 34' includes a square portion 36' and a round portion 38'. The camera 12 is mounted in the aperture 28' of the ball 14' as shown in FIG. 5.

In the embodiment shown in FIGS. 5–8, each linkage 18' includes two end portions 56 and a middle portion 60. Each end portion 56 includes a small hole 58 for rotatably attaching the linkage 18' to the socket 16'. The middle portion 60 of each linkage 18' includes a slot 48' that is sized to fit over the post 34' of the ball 14', Referring to FIG. 7, the central portion of each linkage 18 is positioned, such that the slot of a radially inward situated linkage is disposed around the square portion 36' of the post 34'.

The radially outwardly situated linkage is positioned such that its slot 48' is disposed around the round portion 38' of the post 34'.

Figure 6:
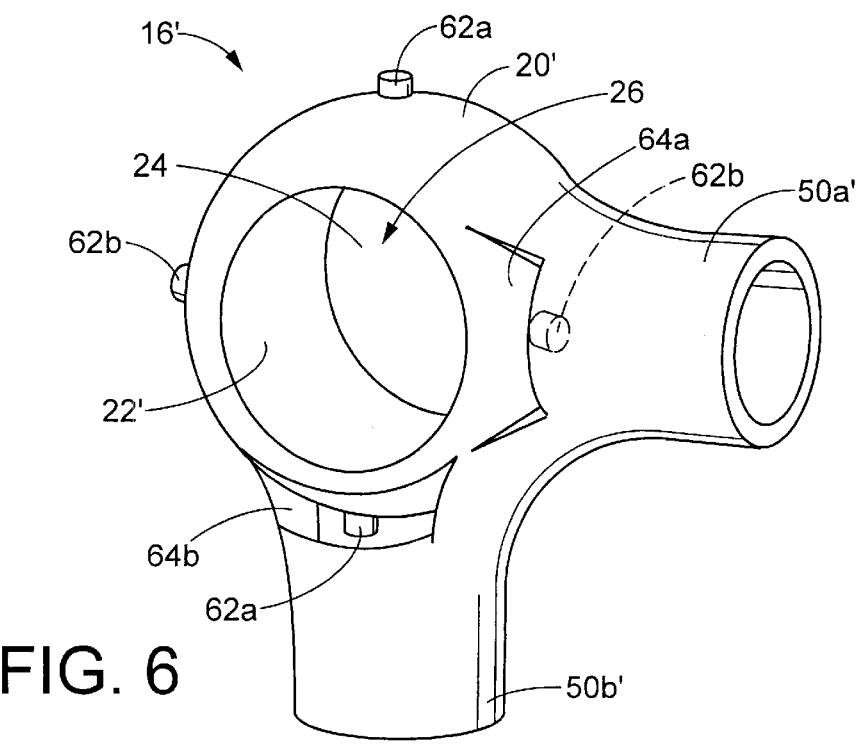
FIG. 6 is a perspective view of a socket of a camera mount of the present invention.
Figure 7:
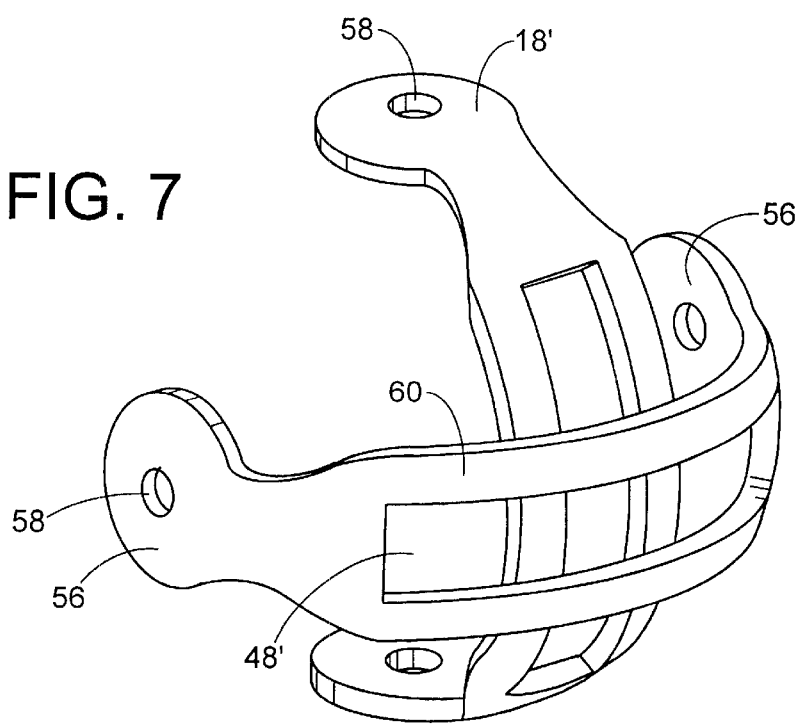
FIG. 7 is a perspective view of first and second linkages of a camera mount of the present invention.
Figure 8:
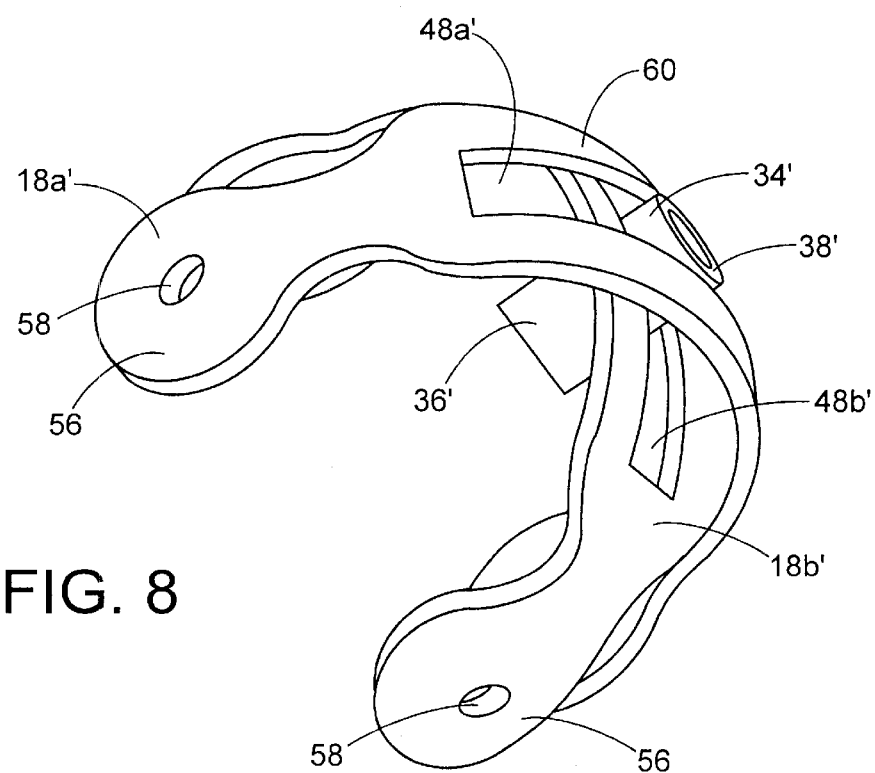
FIG. 8 is a perspective view of first and second linkages coupled to a post of a camera mount of the present invention.

Referring to FIGS. 5 and 6, the socket 16' includes an interior surface 22' that is sized to fit around the spherical outer surface 30' of the ball 14' and allows the ball 14' to rotate freely within the socket 16'. Referring to FIG. 6, nubs 62a, 62b extend from the exterior surface 20' of the socket 16'. The nubs 62a, 62b are slightly smaller than the small holes 58 in the linkages 18', allowing each linkage 18' to be snapped onto the socket 16. First and second sleeves 50a', 50b' extend from the exterior surface 20' of the socket 16'. The socket 16' includes two cut-outs 64a, 64b between the exterior surface 20' of the socket and each sleeve 50a, 50b. The cut-outs 64a, 64b are sized to accept one of the end portions 56 of each linkage 18' and allow the linkage 18' to rotate about the nubs 62a or 62b that extend from the exterior surface 20' of the socket 16'.

The camera mount 10 illustrated in FIGS. 5–8, allows a camera 12 to be positioned by selectively rotating the end portions 56 of the linkages 18'. In the exemplary embodiment, the end portions 56 that extend through the cut-outs 64a, 64b are engaged to rotate the linages 18' (see FIG. 10). In the exemplary embodiment, shafts driven by a servomotor extend through the sleeves 50a', 50b' and are attached to an end portion of each of the linkages 18' to rotate the end portions 56 of the linkages 18'. When the first linkage 18a' is rotated about the nub 62a on the exterior surface 20' of the socket 16', the post 34' is moved along a path defined by the slot 48b' of the second linkage 18b', which positions the ball 14' within the socket 16'. When the second linkage 18b' is rotated about the second nubs 62b the second linkage 18b' causes the post 34' to move along a path defined by the slot 48a' positioning the ball 14' within the socket 16'. By rotating the linkages 18a', 18b' in a controlled manner, the camera mount 10 accurately positions the camera in a very responsive manner, because neither of the servomotors, which drive the linkages, have to carry the weight of the other servomotor.

Figure 9:
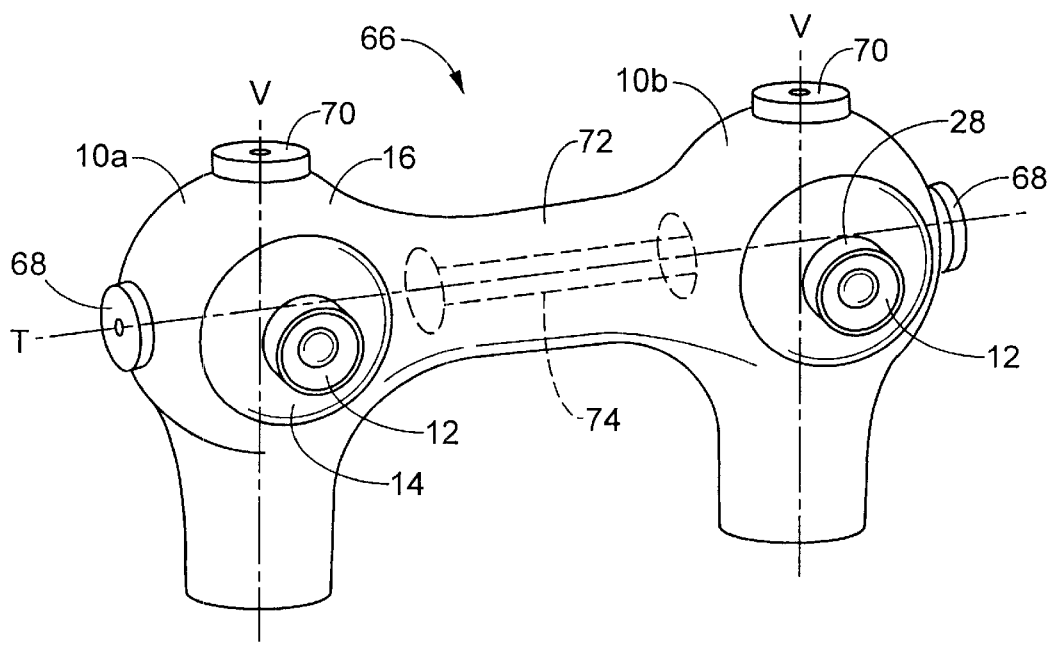
FIG. 9 is a perspective view of two camera mounts of the present invention coupled together for stereo vision viewed generally from a front of the camera mount.
Figure 10:
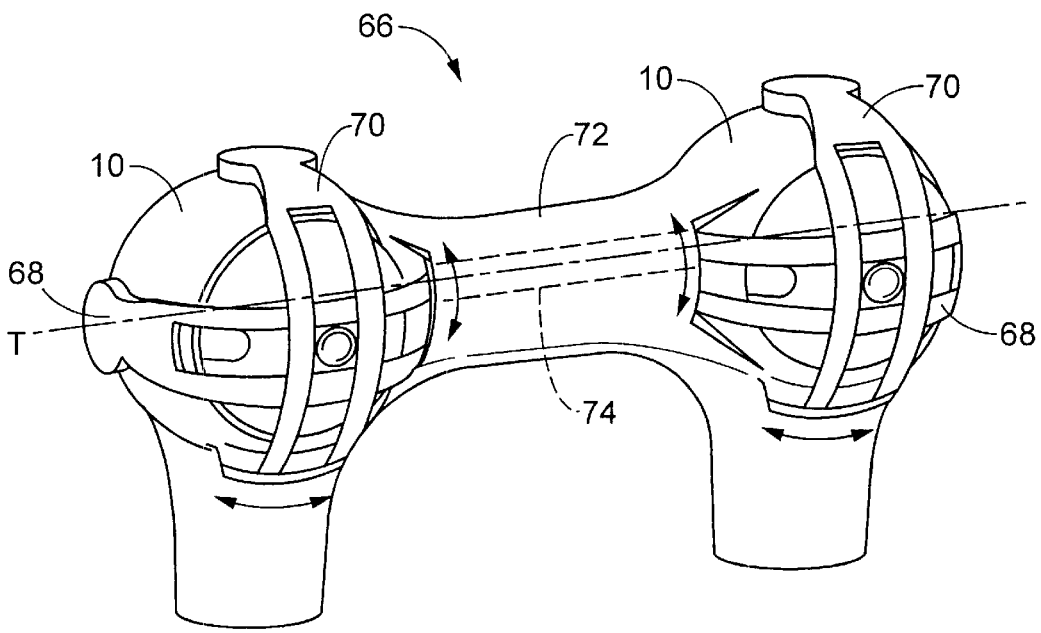
FIG. 10 is a perspective view of two camera mounts coupled together for stereo vision viewed generally from a rear of the camera mount.

FIGS. 9 and 10 illustrate two camera mounts 10 connected together to form a parallel, two degree of freedom camera mount 66. In the exemplary embodiment, each camera mount 10a, 10b includes a tilt linkage 68 that moves the ball 14 of each camera mount about a tilt axis T. Each camera mount 10a, 10b also includes a verge linkage 70 that rotates the ball 14 of each camera mount about a verge axis V. In the exemplary embodiment, the two camera mounts 10a, 10b are coupled together by a hollow coupling sleeve 72. In the embodiment shown in FIGS. 9 and 10, the tilt linkages 68 of the parallel camera mount 66 are coupled with a coupling linkage 74. In this embodiment, a servo motor is coupled to the tilt linkage 68 of one of the camera mounts that make up the parallel two degree of freedom camera mount 66. A servo motor is coupled to the verge linkage 70 of each camera mount 10 that makes up the parallel camera mount 66. In this embodiment, the ball 14 of each camera mount independently pans about the verge axis V. The balls 14 of the camera mount 10 move in unison about the tilt axis T in this embodiment.

In an alternate embodiment, the parallel two degree of freedom mount allows the ball 14 of each camera mount to be positioned completely independently about the verge axis V and the tilt axis T. In this embodiment, there is no coupling linkage 74 to attach the tilt linkages of each camera mount. Two verge servo motors and two tilt servo motors are included to position the verge linkage and tilt linkage of each camera mount 10 of the parallel camera mount 66. In this embodiment, movement of the ball 14 of one camera mount about the verge axis V and tilt axis T is completely independent of the rotation of the ball of the second camera mount of the parallel camera mount 66.

Figure 11:
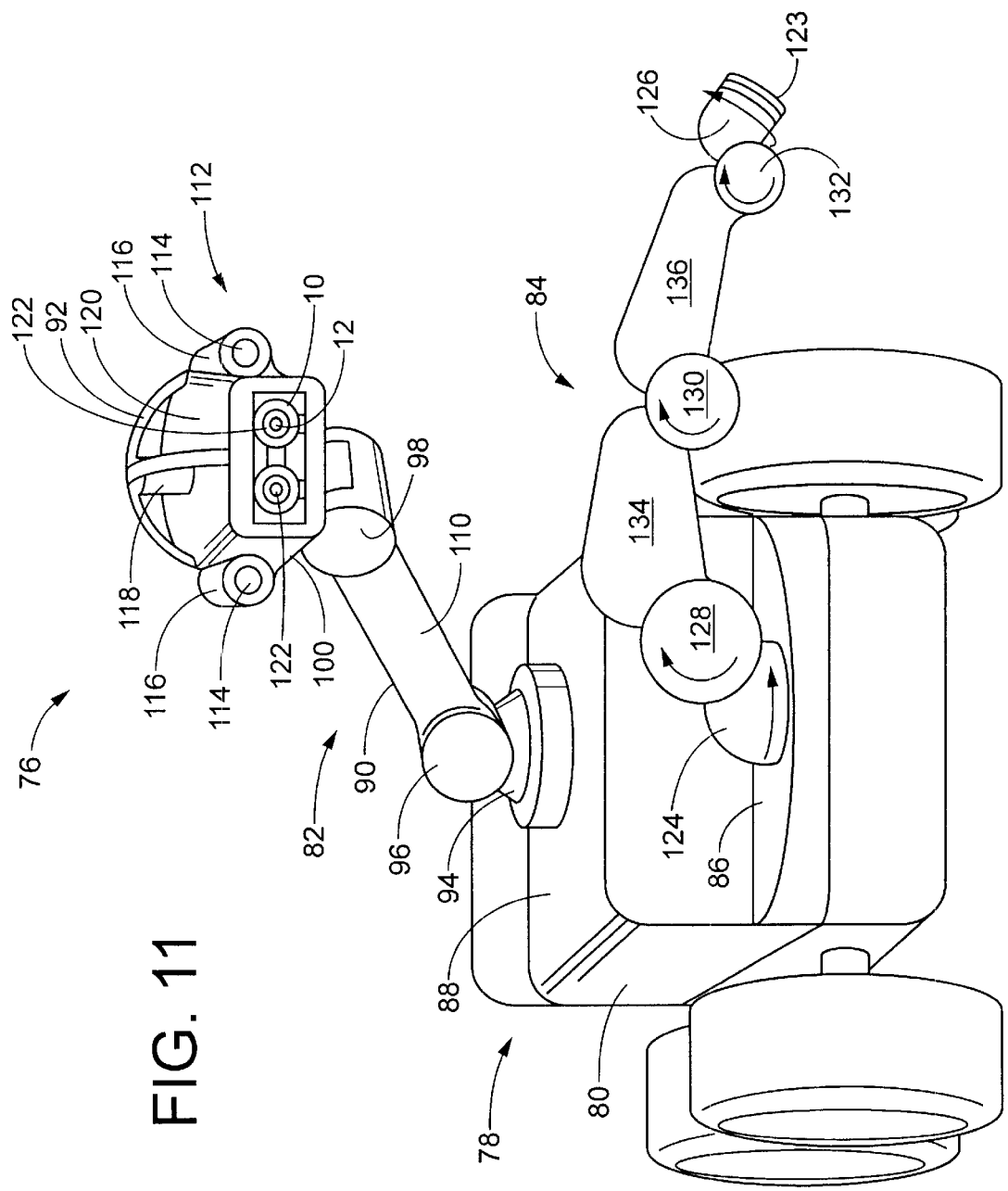
FIG. 11 is a perspective view of a robotic arm and head unit mounted to a rover.

The compact design of the camera mount 10 allows it to be used for a multitude of applications, including teleconferencing, positioning of cameras on the exterior of a space craft, security cameras, intelligent highway control of automobiles, entertainment, and robot vision. A rover 76 having an arm and head unit 78 that includes a parallel two degree of freedom camera mount 66 is illustrated in FIG. 11.

The arm and head unit 78 includes a deck 80, a head unit 82, and an arm unit 84. The deck houses a set of electronics which drive both the head unit 82 and the arm unit 84. The size of the deck is customized to fit existing rover designs. The deck 80 includes a bow shaped shelf 86 for mounting the arm unit 84. The shelf 86 is lower than a top surface 88 of the deck, allowing the arm unit 84 to reach the ground. The deck 80 includes a turret-shaped ring which extends from the top surface 88 for mounting the head unit 82. By mounting the head unit on the top surface of the deck 88, the cameras of the head unit 82 are positioned at a maximum height.

The head unit 82 includes a neck 90 that couples the head 92 to the deck 80. The neck 90 is a four degree of freedom system. The neck 90 includes a first roll joint 94, a first pitch joint 96, a second pitch joint 98, a second roll joint 100 and a rigid boom 110. The first roll joint 94 connects the neck 90 to the top surface of the deck 88, serving at a turret. The first roll joint 94 is connected to a first pitch joint 96. The first pitch joint is connected to the second pitch joint 98 by the rigid boom. The second roll joint 100 connects the head 92 to the second pitch joint 98. In the exemplary embodiment, the axis of the second roll joint is coplanar with the central axis of the head 92. It should be readily apparent to those skilled in the art that necks, including different numbers of joints and degrees of freedom, could be substituted for the neck illustrated in FIG. 11. In the exemplary embodiment, the neck is actively stabilized.

The head includes sensors 112 for visual servoing of the arm unit 84, for navigating the rover, for human tracking on rough terrain, and dextrous manipulation in the field. The sensors 112 included on the head 92 include three types of cameras, accelerometers which provide for vestibula-ocular reflex, and microphones and speakers for human interaction. Referring to FIG. 11, the main stereo vision cameras 114 are a pair of digitally controlled zoom and focus cameras that include a fire wire interface, for connection to a computer. The main stereo vision cameras 114 are fixed to the head 92 in ear pods 116 that are pointed by manipulating the four degree of freedom neck. A panospheric camera 118 with a 360° field of view is mounted on the top surface 120 of the head. The panospheric camera 118 provides a data set that supports electronic pan, tilt and zoom functionality that provides the robot and supervisors with needed situational awareness for working as a member of a team. The third camera technology is a pair of miniature color cameras 122 mounted in the parallel two degree of freedom camera mount 66 in the center of the head unit. The miniature color cameras 122 in the parallel two degree of freedom camera mounts 66 allow high speed pointing of the cameras, even while the rover is vibrating. In the exemplary embodiment, stereo cameras are able to view the position of the arm and surrounding objects. The camera's provide signals to a control that are indicative of the position of an end 123 or tool of the arm and the positions of surrounding viewed objects.

The arm unit 84 is connected to the bow shaped shelf 86 of the deck 80. The arm shown in FIG. 11 is configured to allow for five degrees of freedom. The arm includes first and second roll joints 124, 126, three pitch joints 128, 130, 132 and two booms 134, 136. The first roll joint 124 is connected to the bow shaped shelf 86. The first boom 134 is connected to the first roll joint 124 by the first pitch joint 128. The first boom is connected to the second boom by the second pitch joint 130. The second roll joint is connected to the second boom by the third pitch joint 132.

Figure 12:
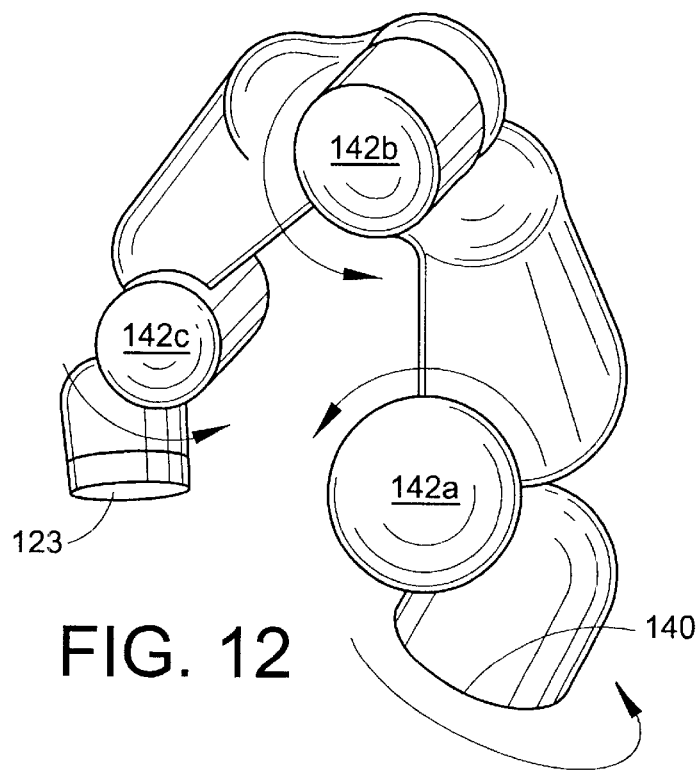
FIG. 12 is a perspective view of a robotic linkage having 4-degrees of freedom.

It should be readily apparent to those of skill in the art that arms having any number of joints and any number of degrees of freedom can be used on the arm and head unit 78. In the exemplary embodiment, the arm is reconfigurable from four to seven degrees of freedom. FIG. 12 shows a four degree of freedom arm that may be used with the arm and head unit 78. The four degree of freedom arm includes a roll joint 140 that is adapted to be connected to the bow shaped shelf 86 and three pitch joints 142a, 142b, 142c.

Figure 13:
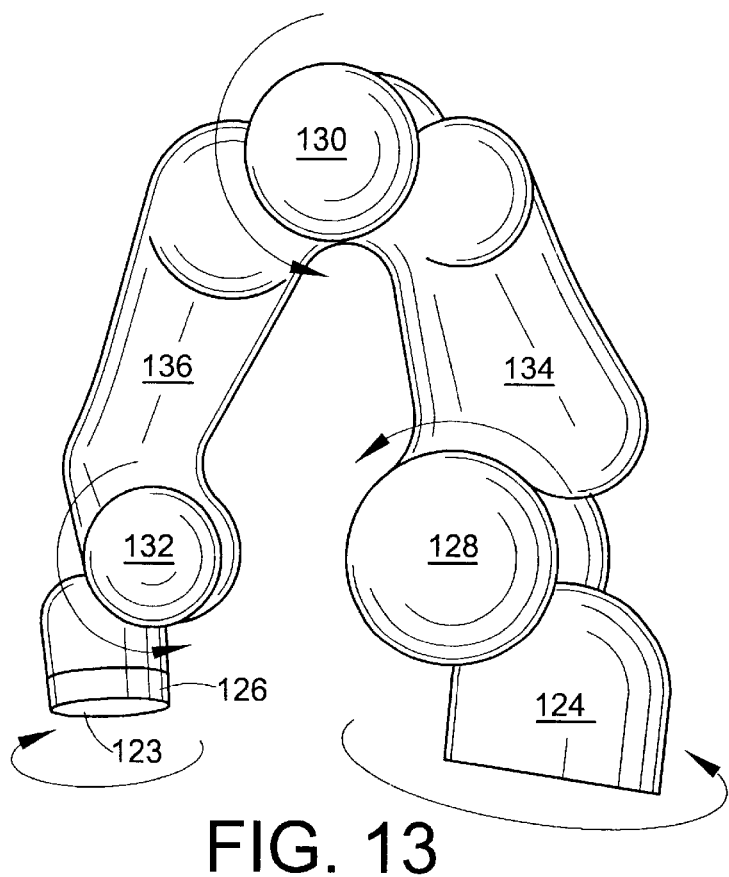
FIG. 13 is a perspective view of a robotic linkage having 5-degrees of freedom.
Figure 14:
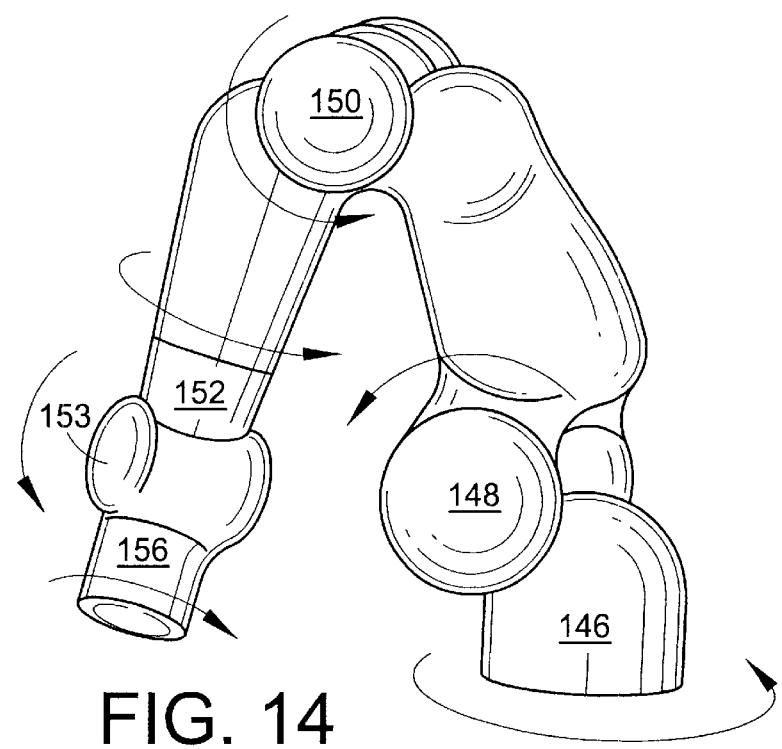
FIG. 14 is a perspective view of a robotic linkage having 6-degrees of freedom.

FIG. 13 shows the five degree of freedom arm that is shown attached to a rover in FIG. 11. FIG. 14 shows a six degree of freedom arm 144 that may be incorporated into the arm and head unit 78. The six degree of freedom arm 144 includes a first roll joint 146 that is adapted to be attached to the bow shaped shelf 86 of the deck 80, a first pitch joint 148, a second pitch joint 150, a second roll joint 152, a third pitch joint 153, and a third roll joint 156.

Figure 15:
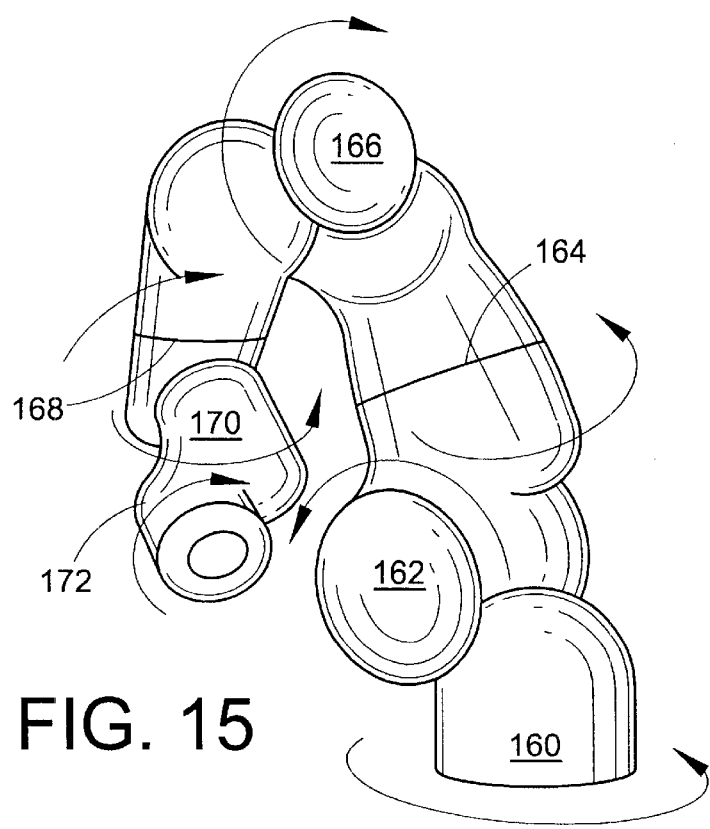
FIG. 15 is a perspective view of a robotic linkage having 7-degrees of freedom; and, FIG. 16 is a schematic representation of a control for a robotic arm and head unit.

FIG. 15 shows an arm having seven degrees of freedom. The seven degrees of freedom arm includes a first roll joint 160 that is adapted to be connected to the deck 80. The first roll joint 160 is connected to a first pitch joint 162. The first pitch joint 162 is connected to a second roll joint 164. The second roll joint 164 is connected to a second pitch joint 166. The second pitch joint 166 is connected to a third roll joint 168. The third roll joint 168 is connected to a third pitch joint 170. The third pitch joint 170 is connected a fourth roll joint 172 creating a seven degree of freedom arm.

In the exemplary embodiment, the arm 84 and neck 90 are constructed of components made using a non-metallic structure with a wound fiber layup over custom mandrels that are manufactured in the shape of the joints exterior. The fiber is pulled from a large spool through a bath of epoxy and is wound upon the mandrel for the component of the arm or neck being constructed. For tubular structures, the mandrel is a steel or aluminum cylinder. A release agent is applied to the mandrel before the filament is wound, allowing the composite part to be removed from the mandrel. After the releasing agent is applied, the mandrel is placed under tension in a winding machine, which rotates the mandrel while moving a carriage that applies the composite filament material to the mandrel. Once the composite material is applied to the neck or arm component, a nonstick plastic filament is wrapped under tension around the part. The film is applied under tension to compact the part and is removed after the part hardens. The mandrel is placed in a computer controlled oven to harden the epoxy, solidifying the composite component. The mandrel is then removed. Final machining and finishing of the component of the arm or neck bring the component into final form. Using this material minimizes the weight of the arm or neck while maintaining the desired strength.

Figure 16:
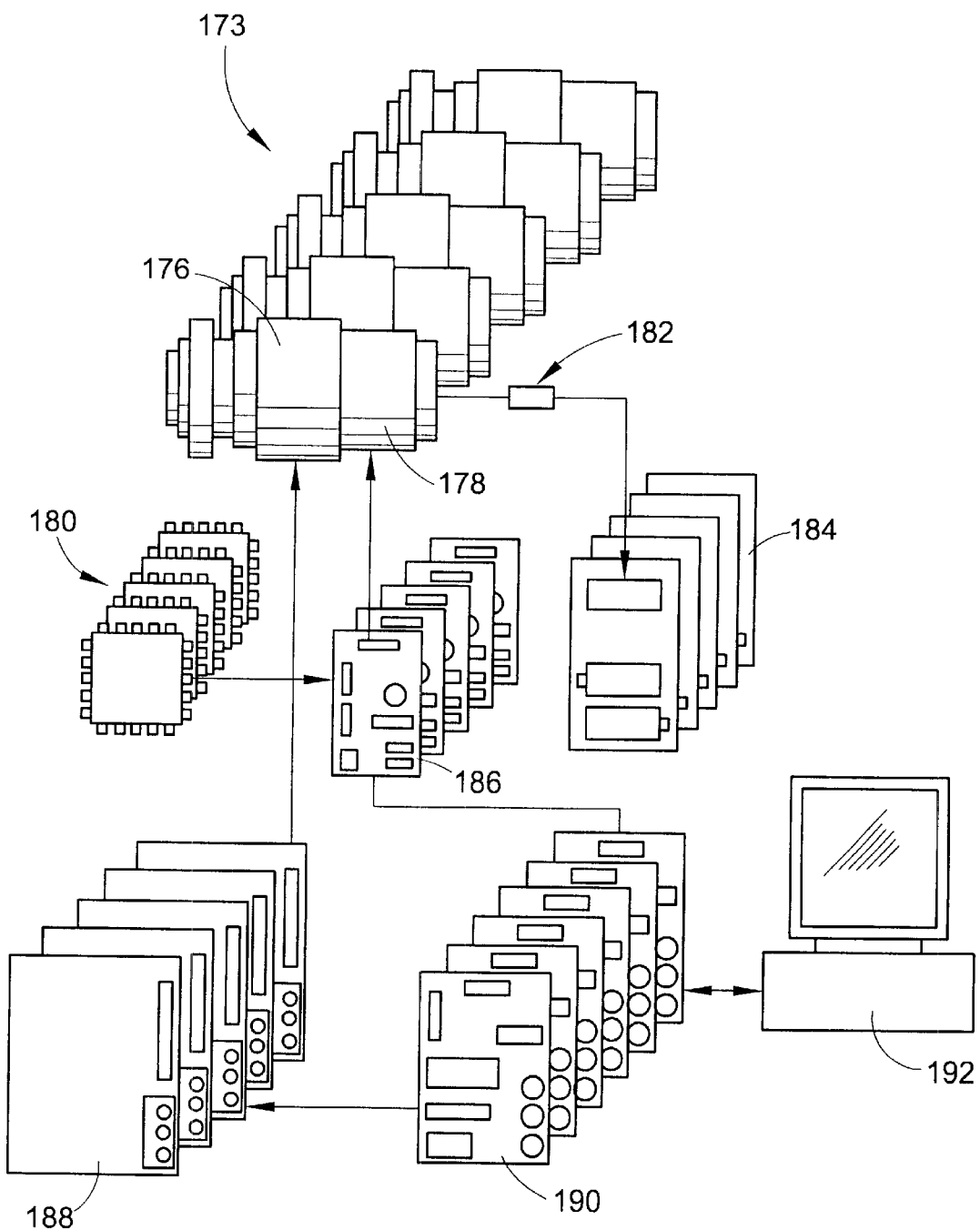

The control system 173 for the arm 84 or neck 90 is shown schematically in FIG. 16. Each joint will include a motor 176 for moving the joint, and a brake 178 for stopping the joint. The control system 174 includes a joint output resolver 180, a motor side optical encoder 182, an encoder counter circuit 184, an input/output card 186, an amplifier 188, a servo level control board 190 and a personal computer 192. The motor 176 included in each joint drives the joint to the desired location. In the exemplary embodiment, the motor is a DC brushless motor that is coupled to a harmonic drive. The brake 178 included in each joint stops the motor and the joint at the desired position. In the exemplary embodiment, a bi-stable brake that uses a metastable intermediate position that allows the brake to change state with only a pulse command, is used in each joint.

In the exemplary embodiment, the resolvers 180 monitor the position of each joint and provide a signal indicative of the position of the joint to the personal computer 192 through the input/output card 186 and servo level control board 190. This signal is analyzed by the personal computer to determine the position of the joint. In the exemplary embodiment, the resolvers 180 are small profile resolvers that can be nested around a harmonic drive. A resolver to digital converter is included in the exemplary embodiment, enabling the control system to remain purely digital.

The motor side optical encoders 182 monitor the relative position of the motor 176. The encoder 182 counts the number of revolutions of the motor and provides a signal to the personal computer 192 by way of the input/output card 186 and the servo level control board 190. The personal computer 192 analyzes the signal provided by the encoders t6 determine the position of the servomotor and the joint.

The input/output card 186 is used to backup the signals from the encoder, provide an interface between the resolver and the servo level control board and provide a brake control.

The amplifier amplifies signals from the PC 192 to drive the servomotors 176. The servo level control board 190 provides and interface between the input/output board and the personal computer 192 and the amplifier 188.

To move the joint to a desired position, the personal computer 192 provides a signal to the servo level control board indicative of desired servomotor position. The amplifier amplifies the signal and provides it to the motor 176. As the motor begins to move the joint the joint output resolver 180 monitors the position of the joint. When the desired position is reached, the input/output card causes the brake 178 to stop the joint at that position.

The arm and head unit 78 can perform practical manipulation and inspection tasks. By developing the arm and head as a single unit, location of the arm by the vision system becomes greatly simplified enabling coordinated operation.

In one embodiment, signals from stereo cameras are utilized to move the arm to a viewed position. The stereo cameras provide a signal to the personal computer 192 that is indicative of the position of an object perceived by the cameras. The personal computer 192 processes the signal to determine the position of the perceived object relative to the position of the end or tool of the arm. In the exemplary embodiment the personal computer 192 provides signals to the servomotors 176 that cause the end or tool of the arm to move to the location of the perceived object.

While the invention has been described with herein in its currently preferred embodiment, or embodiments, those skilled in the art will recognize that other modifications may be made without departing from the invention and it is intended to claim all modifications and variations that fall within the spirit and scope of the invention.

I claim:

1. A camera mounting apparatus comprising:
   a) a socket including and interior surface and an opening;
   b) a ball positioned within a region defined by said interior surface of said socket, said ball including an aperture for mounting a camera;
   c) a first linkage operably connected to said ball wherein movement of said first linkage causes relative rotational movement of said ball along a first path with respect to said
   d) a second linkage operably connected to said ball wherein movement of said second linkage causes relative rotational movement of said ball along a second path with respect to said socket.

2. The apparatus of claim 1 wherein said first linkage includes a first shaft portion and a first arm rotatably connected said socket and said second linkage includes a second shaft portion and a second arm rotatably connected said socket.

3. The apparatus of claim 1 wherein two camera mounts are coupled together for mounting stereo cameras.

4. The apparatus of claim 1 wherein said first linkage includes a first shaft portion and a first arm portion, wherein rotation of said first shaft portion causes relative rotation between said first arm portion and said socket, wherein said second linkage includes a second shaft portion and a second arm portion, wherein rotation of said second shaft portion causes relative rotation between said second arm portion and said socket, wherein rotation of said first shaft portion is independent of rotation of said second shaft portion.

5. A camera mounting apparatus comprising:
   a) a socket including an interior surface and an opening;
   b) a ball positioned within a region defined by said interior surface of said socket, said ball including an aperture for mounting a camera and a coupling point for rotating said ball relative to said socket;
   c) a first arm rotatably connected to said socket, said first arm having a first slot coupled to said coupling point; and
   d) a second arm rotatably connected to said socket, said second arm having a second slot coupled to said coupling point, wherein rotation of said first and second arms moves said coupling point to cause relative rotation of said ball with respect to said socket.

6. The apparatus of claim 5 wherein, said first arm includes a shaft portion and a coupling portion that includes said slot, wherein rotation of said shaft portion causes relative rotation between said coupling point and said socket, moving said coupling point along a path defined by said second slot.

7. The apparatus of claim 5 wherein said coupling point is a post.

8. The apparatus of claim 5 wherein said coupling point is configured to prevent rotation of said coupling point within said slot.

9. The apparatus of claim 5 wherein said coupling point includes a rectangular portion.

10. The apparatus of clam 5 wherein said first and second arms are adjacent to said exterior surface of said socket.

11. The apparatus of claim 5 wherein two camera mounts are coupled together for mounting stereo cameras.

12. A camera mount apparatus comprising:
    a) a socket including and interior surface and an exterior surface, said socket including an opening;
    b) a ball positioned within a region defined by said interior surface of said socket, said ball including an aperture for mounting a camera and a post extending from said ball having a square portion for moving said ball relative to said socket;
    c) a first linkage rotatably connected to said socket having a first arm with a first slot coupled to said post such that said post is constrained to motion along a first path defined by said first slot; and
    d) a second linkage rotatably connected to said socket having a second arm with a second slot coupled to said post such that said post is constrained to motion along a second path defined by said second slot, wherein rotation of said first linkage with respect to said socket moves said post along said second path and rotation of said first linkage moves said post along said first path to cause relative rotation of said ball with respect to said socket.

13. The apparatus of claim 12 wherein, said first arm includes a shaft portion and a coupling portion that includes said slot, wherein rotation of said shaft portion causes relative rotation between said coupling portion and said socket, moving said coupling point along said second slot.

14. The apparatus of claim 12 wherein two camera mounts are coupled together for mounting stereo cameras.

15. A method for positioning a camera comprising:
    a) mounting a camera in an aperture in a ball;
    b) moving a first linkage operably connected to said ball to rotate said ball along a first path within an interior region of a socket to position said camera; and
    c) moving a second linkage that moves independently of said first linkage to rotate said ball along a second path within the interior region of the socket to position said camera.

16. The method of claim 15 wherein moving said first linkage comprises rotating a shaft portion of said first linkage.

17. A method for positioning a camera comprising:
    a) mounting a camera in an aperture in a ball having a coupling post;
    b) rotating a shaft portion of a first linkage to cause rotation of a first arm portion of said first linkage with respect to a socket, wherein rotation of said first arm portion moves said coupling post along a first path defined by a slot in a second arm portion of a second linkage to rotate said ball with respect to said socket; and
    c) rotating a shaft portion of a second linkage to cause rotation of said second arm portion of said second linkage with respect to said socket, wherein rotation of said second arm portion moves said coupling post along a second path defined by a slot in said first arm portion of the said first linkage to move said ball with respect to said socket.

18. A robotic arm and head unit comprising:
    a) a robotic arm connected to a deck:
    b) a robotic head connected to said deck;
    c) a camera mount connected to said head, said camera mount including a socket having an interior surface, a ball positioned within a region defined by said interior surface, said ball including an aperture for mounting a camera, a first linkage operably connected to said ball for rotating said ball with respect to said socket along a first path, and a second linkage operably connected to said ball for rotating said ball in said socket along a second path;
    d) a camera connected to said mount; and
    e) a control for moving said arm and head and positioning said camera.

19. The apparatus of claim 18 wherein perception of an object by said camera provides a signal to said control, said signal is processed by said control to determine a position of said object and said control causes said arm to move a tool attached to an end of said arm to the position of the sensed object.

20. The apparatus of claim 18 wherein said head is mounted to said deck by a robotic neck.

21. A robotic arm and head unit comprising:
    a) a robotic arm connected to a deck:
    b) a robotic head connected to said deck;
    c) a first camera mount connected to said head, said first camera mount including a socket having an interior surface, a ball positioned within a region defined by said interior surface, said ball including an aperture for mounting a camera, and a linkage operably connected to said ball for rotating said ball in said socket;
    d) a second camera mount coupled to said first camera mount for mounting stereo cameras;
    e) a first camera connected to said first mount;

f) a second camera connected to said second mount;

g) a control for moving said arm and head and positioning said camera.

22. A robotic arm and head unit comprising:

a) a robotic arm connected to a deck:

b) a robotic head mounted to said deck by a robotic neck including four degrees of freedom;

c) a camera mount connected to said head, said camera mount including a socket having an interior surface, a ball positioned within a region defined by said interior surface, said ball including an aperture for mounting a camera, and a linkage operably connected to said ball for rotating said ball in said socket;

d) a camera connected to said mount;

e) a control for moving said arm and head and positioning said camera.

23. A robotic arm and head unit comprising:

a) a robotic arm connected to a deck, said arm includes at least four degrees of freedom;

b) a robotic head connected to said deck;

c) a camera mount connected to said head, said camera mount including a socket having an interior surface, a ball positioned within a region defined by said interior surface, said ball including an aperture for mounting a camera, and a linkage operably connected to said ball for rotating said ball in said socket;

d) a camera connected to said mount; and e) a control for moving said arm and head and positioning said camera.

* * * * *